(12) United States Patent
Baudu et al.

(10) Patent No.: US 12,078,205 B2
(45) Date of Patent: Sep. 3, 2024

(54) MOTOR VEHICLE WHEEL ASSEMBLY

(71) Applicant: NTN-SNR ROULEMENTS, Annecy (FR)

(72) Inventors: Alexandre Baudu, Annecy (FR); Vincent Pourroy-Solari, Thones (FR)

(73) Assignee: NTN-SNR ROULEMENTS, Annecy (FR)

( * ) Notice: Subject to any disclaimer, the term of this patent is extended or adjusted under 35 U.S.C. 154(b) by 132 days.

(21) Appl. No.: 17/759,284

(22) PCT Filed: Jan. 25, 2021

(86) PCT No.: PCT/EP2021/051627
§ 371 (c)(1),
(2) Date: Jul. 21, 2022

(87) PCT Pub. No.: WO2021/148675
PCT Pub. Date: Jul. 29, 2021

(65) Prior Publication Data
US 2023/0063439 A1 Mar. 2, 2023

(30) Foreign Application Priority Data

Jan. 24, 2020 (FR) .................................... 2000720

(51) Int. Cl.
*F16C 19/18* (2006.01)
*B60B 27/00* (2006.01)

(52) U.S. Cl.
CPC ........ *F16C 19/186* (2013.01); *B60B 27/0042* (2013.01); *F16C 19/185* (2013.01); *F16C 2326/02* (2013.01)

(58) Field of Classification Search
CPC .... F16C 19/184; F16C 19/185; F16C 19/186; F16C 19/187; F16C 19/505; F16C 33/60;
(Continued)

(56) References Cited

U.S. PATENT DOCUMENTS 8,092,096 B2 * 1/2012 Shibata ................. F16C 35/063
384/589
8,256,967 B2 * 9/2012 Langer .................. F16C 19/186
384/589

(Continued)

FOREIGN PATENT DOCUMENTS

DE 102007016427 A1 10/2008
FR 3003201 A1 9/2014
(Continued)

OTHER PUBLICATIONS

International Search Report and Written Opinion mailed Apr. 23, 2022, in connection with International Patent Application No. PCT/EP2021/051627, filed Jan. 25, 2021, 12 pgs. (including translation).
(Continued)

*Primary Examiner* — James Pilkington
(74) *Attorney, Agent, or Firm* — Chiesa Shahinian & Giantomasi PC

(57) ABSTRACT

A motor vehicle drive wheel assembly comprising a fixed subassembly comprising two outer raceways; a rotating subassembly comprising a wheel hub, two inner raceways and two rows of rolling bodies that are arranged in two pitch planes PP1 and PP2. One of the inner raceways is formed on a rolling bearing ring that bears against a transmission bowl at an annular contact interface situated between the two pitch planes.

20 Claims, 4 Drawing Sheets

(58) Field of Classification Search
CPC ............. F16C 2240/80; F16C 2326/02; B60B 27/0005; B60B 27/0015; B60B 27/0026; B60B 27/0036; B60B 27/0042
See application file for complete search history.

(56) References Cited

U.S. PATENT DOCUMENTS

| | | |
|---|---|---|
| 8,282,288 B2 | 10/2012 | Dlugal et al. |
| 8,439,572 B2 | 5/2013 | Fischer et al. |
| 8,777,491 B2 | 7/2014 | Wang et al. |
| 2010/0119185 A1 | 5/2010 | Fischer et al. |

FOREIGN PATENT DOCUMENTS

| | | |
|---|---|---|
| FR | 3052104 A1 | 12/2017 |
| JP | 2010-159011 A | 7/2010 |
| JP | 2013-018478 A | 1/2013 |
| WO | 2012176849 A1 | 12/2012 |

OTHER PUBLICATIONS

International Search Report and Written Opinion mailed Jun. 2, 2022, in connection with International Patent Application No. PCT/EP2021/051628, filed Jan. 25, 2021, 11 pgs. (including translation).

Non-Final Office Action mailed Apr. 22, 2024 in connection with U.S. Appl. No. 17/759,287, filed Jul. 21, 2022, 18 pgs.

\* cited by examiner

MOTOR VEHICLE WHEEL ASSEMBLY

CROSS-REFERENCE TO RELATED APPLICATIONS

This application is a national stage under 35 U.S.C. 371 of International Patent Application Serial No. PCT/EP2021/051627, filed Jan. 25, 2021, which claims priority to French Patent Application No. 2000720, filed Jan. 24, 2020; the disclosures of all are incorporated herein by reference in their entirety.

TECHNICAL FIELD OF THE INVENTION

The invention relates to a motor vehicle wheel assembly.

STATE OF THE PRIOR ART

A motor vehicle drive wheel assembly, once mounted on the vehicle, generally comprises a fixed subassembly intended to be secured to a suspension element of the vehicle and comprising a first outer raceway and a second outer raceway defining an axis of rotation; a rotating subassembly, capable of rotating relative to the fixed member about the axis of rotation, and comprising a wheel hub; a transmission bowl, a first inner raceway located opposite the first outer raceway, a second inner raceway located opposite the second outer raceway; and rolling bodies, forming a first row of rolling bodies between the first outer raceway and the first inner raceway and a second row of rolling bodies between the second outer raceway and the second inner raceway. The wheel hub has an attachment interface for a wheel rim and a brake disc. The assembly therefore typically has a stack of technical functions; arranged along the axis of rotation from the inside to the outside of the vehicle: transmission of torque, attachment to the suspension of the vehicle, guidance in rotation; braking and rolling, which requires a large size in the axial direction; that is to say, transverse in the coordinate system of the vehicle.

It has been proposed in document FR 3,052,104 to shrink an inner rolling bearing ring for the second inner raceway onto the transmission bowl, which makes it possible to reduce the axial size for a given distance between the two rows of rolling bodies; while increasing the pitch diameter of the row of rolling bodies located on the inside of the vehicle. Insofar as the payload and the camber stiffness are increasing functions of the distance between the two rows of rolling bodies and of the pitch diameter of the rows of rolling bodies, this architecture provides a solution for reconciling reduced axial bulk and good performance in terms of payload and camber stiffness.

Electric and hybrid vehicle powertrains often turn out to be more bulky than combustion engine powertrains in the width direction of the vehicle at the drive wheels, which leads to shortening of the transverse drive shafts. This shortening is undesirable because it leads to greater angles in the transmission joints. In this context, any measure making it possible to increase the space available for the transverse transmission shafts, even slightly, is desirable. There is therefore an increased need for compactness of drive wheel assemblies in the axial direction, which does not come at the expense of performance, in particular in terms of payload and rigidity.

DISCLOSURE OF THE INVENTION

The invention aims to provide a motor vehicle drive wheel assembly that combines axial compactness, high payload and a good level of camber stiffness.

To do this, according to a first aspect of the invention, a motor vehicle drive wheel assembly is proposed, comprising:
- a fixed subassembly comprising a first annular outer raceway and a second annular outer raceway centered on a common axis of rotation;
- a rotating subassembly, capable of rotating relative to the fixed subassembly about the axis of rotation, and comprising a wheel hub comprising a flange provided with an interface for attaching a wheel rim or a brake disc, the attachment flange forming a mounting face of the wheel rim or of the brake disc axially facing in a direction of disassembly of the wheel rim or of the brake disc, the direction of disassembly being parallel to the axis of rotation, the mounting face being tangential to an assembly reference plane perpendicular to the axis of rotation, a transmission bowl, and at least one inner rolling bearing ring, the inner rolling bearing ring being shrunk over a shrink-fit bearing of the wheel hub, the inner rolling bearing ring bearing against the transmission bowl at an annular contact interface extending at least in a radial direction with respect to the axis of rotation, the rotating subassembly further comprising a first inner raceway located opposite the first outer raceway and a second inner raceway located opposite the second outer raceway and formed on the inner rolling bearing ring; and
- rolling bodies, forming a first row of rolling bodies capable of rolling on the first outer raceway and the first inner raceway and a second row of rolling bodies capable of rolling on the second outer raceway and the second inner raceway, a first pitch plane containing the centers of the rolling bodies of the first row of rolling bodies being located at a non-zero distance L from a second pitch plane containing the centers of the rolling bodies of the second row of rolling bodies, in the direction of disassembly, the first row of rolling bodies and the second row of rolling bodies being located on the same outer side of a limit plane of the drive wheel assembly tangential to the rolling bodies of the second row of rolling bodies and perpendicular to the axis of rotation;

According to the invention; the annular contact interface between the inner rolling bearing ring and the annular bearing face of the transmission bowl is positioned at least partially, and preferably completely, between the first pitch plane and the limit plane and has a maximum contact diameter DA that is greater than the diameter DF of the shrink-fit bearing and less than a raceway bottom diameter D12 of the second inner raceway.

Here, the maximum contact diameter DA is understood to mean the largest diameter observed at the effective contact between the transmission bowl and the inner rolling bearing ring, and measured in a plane perpendicular to the axis of rotation.

According to the invention, it is proposed to equip the assembly with an inner rolling bearing ring having a specific geometry, which makes it possible to position the second inner raceway radially outside the first inner raceway, and to house part of the transmission bowl, including the annular bearing surface, in a recess formed by the inner rolling bearing ring.

The first raceways and the first row of rolling bodies are intended, once the assembly has been integrated into the vehicle; to be further from a longitudinal median vertical plane of the vehicle than the second raceways and the second row of rolling bodies.

Preferably, the annular contact interface between the inner rolling bearing ring and the annular bearing face of the transmission bowl is positioned at least partially, and preferably completely, between the first pitch plane and the second pitch plane The pitch diameter of the first row of rolling bodies is smaller than the pitch diameter of the second row of rolling bodies, and preferably significantly smaller, to increase the volume available to accommodate the transmission bowl. Preferably, the first outer raceway has a raceway bottom diameter DE1 smaller than the raceway bottom diameter DI2 of the second inner raceway.

The dimensions of the first rolling bearing made by the first inner raceway, the first outer raceway and the first row of rolling bodies and those of the second rolling bearing formed by the second inner raceway, the second outer raceway and the second row of rolling bodies are adapted to the dimensions of the transmission bowl. Thus, according to one embodiment, the transmission bowl has a cavity comprising rolling tracks, the rolling tracks having a track bottom diameter DBO preferably satisfying one or more of the following conditions:
- the track bottom diameter DBO is greater than a raceway bottom diameter DI1 of the first inner raceway,
- the track bottom diameter DBO is less than a raceway bottom diameter of the second inner raceway;
- the track bottom diameter DBO is greater than the maximum contact diameter DA.

One or the other of the two rows of rolling bodies can consist of conical or cylindrical rollers, which is particularly suitable for vehicles whose payload is high.

However, according to a preferred embodiment aimed at minimizing the torque resisting the rotation of the rotating subassembly, in particular for light vehicles (cars or utility vehicles), the rolling bodies are balls. Preferably, the balls forming the first row of rolling bodies have a ball diameter DC1 less than or equal to a ball diameter DC2 of the balls forming the second row of rolling bodies. The increased diameter of the balls of the second row makes it possible to reduce the distance between the two rows of balls, which limits the bending in the inner rolling bearing ring, and therefore the risks of separation between the parts of the rotating subassembly. The outer raceways are preferably enveloping in the axial direction, in the sense that they each have a raceway bottom, located in an intermediate axial position between the axial ends of the raceway.

The rolling bearing ring is preferably a solid metal part, made for example from steel. The shrink fit of the rolling bearing ring on the wheel hub requires a shrink-fit bearing, which, in order to optimize the axial compactness of the assembly, extends to near the first inner raceway. Preferably, the inner rolling bearing ring has an end face facing axially in the direction of disassembly, and located at a distance L1 from a plane containing the points of the annular contact interface between the inner rolling bearing ring and the annular bearing surface of the transmission bowl furthest from the axis of rotation, the distance L1 being less than one and a half times the ball diameter of the balls of the first row of balls.

According to one embodiment, the maximum contact diameter DA of the annular contact interface is less than the sum of twice the diameter DC1 of the rolling bodies of the first row of rolling bodies and the diameter OF of the shrink-fit bearing.

In practice, the drive wheel assembly further comprises a transmission nut and rolling transmission bodies, the rolling transmission bodies being guided by rolling tracks formed in a cavity of the transmission bowl and on the transmission nut. The rolling transmission bodies and the transmission bowl form a transmission joint, which defines a pitch plane passing through the centers of the rolling transmission bodies when the axes of rotation of the transmission nut and of the transmission bowl are aligned, the pitch plane preferably being perpendicular to the axis of rotation defined by the fixed subassembly. It is also possible to define a pitch diameter of the pitch circle on which the centers of the rolling transmission bodies are positioned when the axes of rotation of the transmission nut and of the transmission bowl are aligned.

Preferably, the maximum contact diameter DA of the annular contact interface is less than the pitch diameter DPB of the transmission joint.

To promote the axial compactness of the assembly, the pitch plane of the transmission joint is located at a distance CA from the assembly reference plane, which satisfies one or more of the following conditions:
- the distance CA is less than a pitch diameter of the second row of rolling bodies;
- the distance CA is less than thirteen sevenths of an axial distance measured between the assembly reference plane and the second pitch plane;
- the ratio between the distance CA on the one hand, and the distance L between the first pitch plane and the second pitch plane on the other hand, is less than 4.75, preferably less than 4.6;
- the ratio between, on the one hand, the difference between the distance CA and the distance L2 between the assembly reference plane and the second pitch plane and, on the other hand, a pitch diameter of the second row of rolling bodies, is less than 0.45.

According to one embodiment, the annular contact interface is planar.

According to another embodiment, the annular contact interface is flared, preferably tapered, and preferably has a vertex angle A satisfying one or more of the following conditions:
- the vertex angle A is between 100 and 140°;
- the vertex angle A is equal, to within +/−10°, to a vertex angle B of a frustoconical inner face of the transmission bowl, opposite the annular bearing face.

The radial position of the mounting face affects the stiffness of the assembly. According to one embodiment, the ratio between the maximum contact diameter DA of the annular contact interface and the pitch diameter DP2 of the second row of rolling bodies less than 0.65.

According to one embodiment, the transmission bowl comprises a splined end portion mounted free, fitted or shrunk in a splined tubular portion of the wheel hub, forming a splined contact interface, the rotating subassembly preferably comprising at least one axial holding element attached to the transmission bowl and bearing directly or indirectly against an abutment surface of the wheel hub turned axially in the direction of disassembly. Preferably, the splined contact interface allows disassembly of the wheel hub. The axial holding element may in particular consist of a head of a screw screwed into a threaded hole formed in the transmission bowl parallel to the axis of rotation, or of a nut screwed onto a threaded portion formed on the transmission bowl. It can also be a cold deformation of one end of the transmission bowl or of the wheel hub, ensuring axial interference between the two parts. More generally, the end portion of the transmission bowl may have any cylindrical shape with a non-circular base mounted free, fitted or shrunk in a tubular portion of complementary shape of the wheel hub, forming a contact interface with a non-circular section, the rotating subassembly preferably comprising at least one axial holding element attached to the transmission bowl and bearing directly or indirectly against an abutment surface of the wheel hub turned axially in the direction of disassembly.

For a particularly compact and rigid assembly, one or more of the following arrangements are provided:

the splined contact interface has a spline pitch diameter GPC and the annular contact interface is located axially at a distance LAB from the assembly reference plane PA, such that the sum DPC+LAB is less than the pitch diameter DP2 of the second row of rolling bodies;

a distance measured between an end of the splined contact interface axially closest to the annular contact interface and the assembly reference plane is less than four-fifths of a length measured between the assembly reference plane and the second pitch plane.

According to one embodiment, the wheel hub further comprises a centering bearing for centering the brake disc or the wheel rim, turned radially opposite the axis of rotation and which projects axially with respect to the mounting face in the direction of dismounting. The centering bearing may for example be cylindrical, or comprise two cylindrical portions of different diameters, the portion closest to the mounting face preferably having a larger diameter than the farthest portion, and having the function of centering the brake disc. Other profiles of the centering bearing can be considered. The centering bearing can also be discontinuous, and can comprise annular grooves or grooves parallel to the axis of rotation.

The mounting face of the flange may be flat or comprise striations, splines or grooves, for example radial, annular or spiral.

According to one embodiment, the rolling bodies of the first row of rolling bodies have contact points with the first inner raceway and the first outer raceway, which are located on a first contact cone having a first vertex located relative to the first row of rolling bodies, opposite the second row of rolling bodies, and the rolling bodies of the second row of rolling bodies have contact points with the second inner raceway and the second outer raceway, which are located on a second contact cone having a second vertex located with respect to the second row of rolling bodies, opposite the first row of rolling bodies.

In practice, the fixed subassembly may comprise an attachment damp extending radially with respect to the first outer raceway and to the second outer raceway. The attachment damp is intended to attach the fixed subassembly to a suspension member of the vehicle. To this end, the attachment damp is preferably provided with an attachment interface, which may comprise bores for attaching elements to the suspension member.

According to one embodiment, the fixed subassembly comprises a one-piece solid metal outer ring forming the first outer raceway and the second outer raceway, and preferably also forming the attachment clamp. Alternatively, provision can be made for one and/or the other of the outer raceways to be made in a rolling bearing ring shrunk in a sleeve forming the attachment clamp.

According to one embodiment, the first inner raceway is formed on the wheel hub.

Alternatively, the first inner raceway is formed on a first inner rolling bearing ring shrunk at least partially on the wheel hub and bearing axially against a shoulder of the wheel hub facing axially toward the second row of rolling bodies. The first inner rolling bearing ring has a first axial end facing axially away from the second inner raceway, Preferably, the first inner rolling bearing ring bears axially against a shoulder of the wheel hub facing axially toward the second row of rolling bodies. This shoulder provides axial support for the first inner rolling bearing ring.

Preferably, the wheel hub is a solid one-piece metal part, which contributes to greater rigidity of the assembly. Alternatively, the hub can be a solid one-piece bi-material part, for example a steel/aluminum or steel/composite material combination Preferably, the transmission bowl is a solid one-piece metal part.

Where appropriate, the rotating subassembly further comprises a brake disc bearing on the mounting face, a wheel rim bearing on the brake disc and elements for attaching the wheel rim and the brake disc to the attachment flange.

BRIEF DESCRIPTION OF FIGURES

Other features and advantages of the invention will emerge on reading the following disclosure, with reference to the appended figures.

For greater clarity, identical or similar elements are identified by identical reference signs in all of the figures.

DETAILED DESCRIPTION OF EMBODIMENTS

Figure 1A:
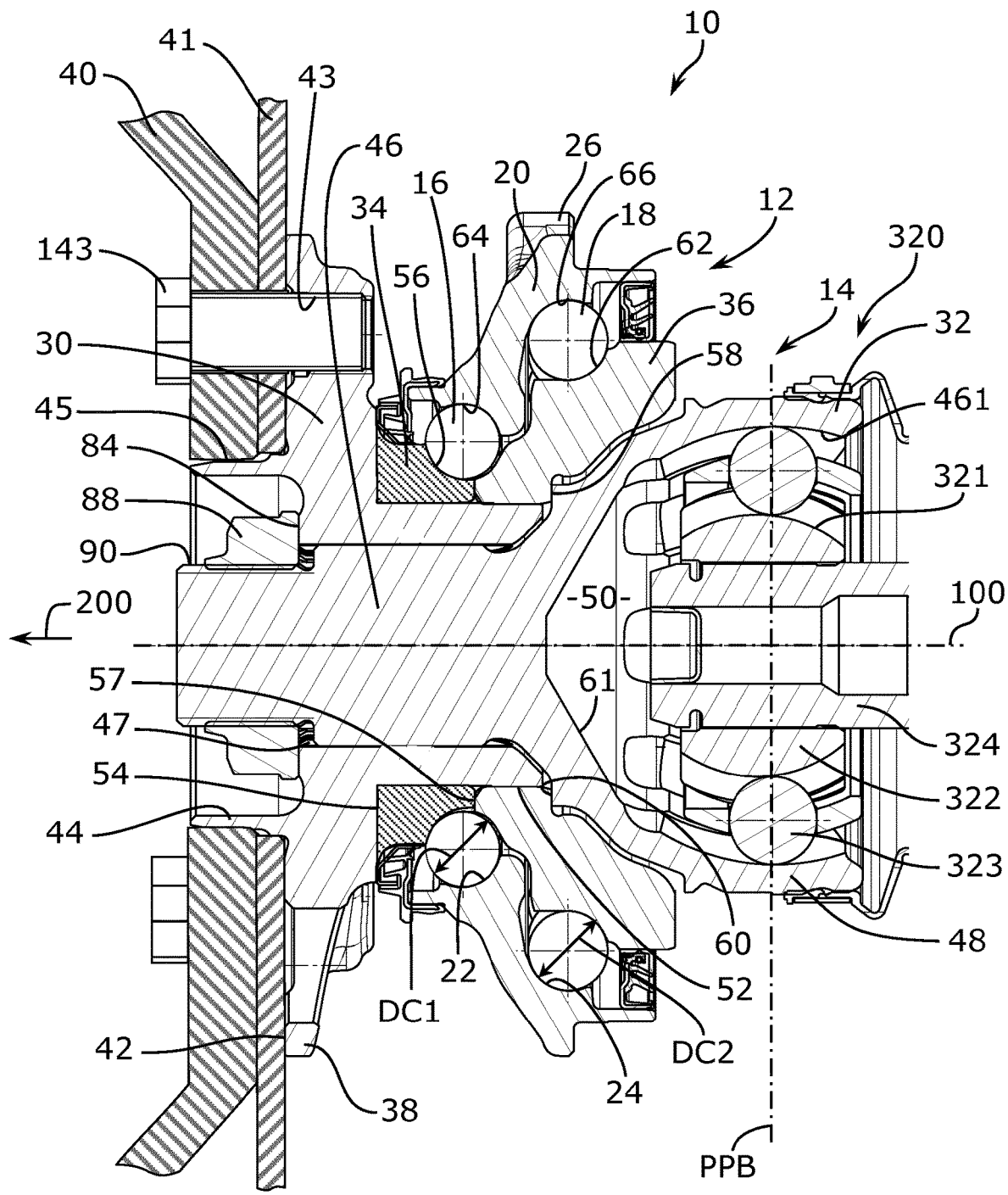
FIG. 1A is a longitudinal sectional view of a motor vehicle drive wheel assembly according to a first embodiment of the invention.

FIG. 1A shows a motor vehicle drive wheel assembly 10, comprising a fixed subassembly 12, intended to be secured to a suspension member of a motor vehicle (not shown) and defining an axis of rotation 100, a rotating subassembly 14, capable of rotating about the axis of rotation 100 inside the fixed subassembly 12, and guiding rolling bodies 16, 18 between the rotating subassembly 14 and the fixed subassembly 12.

The fixed subassembly 12 here is constituted by a one-piece solid metal outer ring 20 on which a first outer raceway 22 and a second outer raceway 24, coaxial, are formed that define the axis of rotation 100. The outer ring further comprises at least one attachment damp 26 extending radially outward, in which bores (not shown in this figure) are formed for attaching the attachment clamp 26 to a suspension member, via attachment elements (not shown).

The rotating subassembly 14 comprises a wheel hub 30, a transmission bowl 32, a first inner rolling bearing ring 34, and a second inner rolling bearing ring 36.

The wheel hub 30 is a solid one-piece metal part, which comprises a flange 38 for attaching a drive wheel rim 40 and a brake disc 41. The flange 38 has a face 42 bearing the brake disc 41, and is provided with attachment bores 43, allowing the insertion of attachment elements 143 of the rim 40 and of the brake disc 41.

The wheel hub 30 also has a centering skirt 44 that projects axially with respect to the planar bearing face 42, in a direction 200 of disassembly of the wheel rim 40 and of the brake disc 41, and has a centering bearing 45, preferably stepped, facing radially outward, comprising a first cylindrical portion for centering the wheel rim 40 and a second cylindrical portion, of equal or greater diameter, for centering the brake disc 41 during assembly. The centering bearing 45 is not necessarily intended to remain in contact with the rim 40 and the brake disc 41 after assembly.

The transmission bowl 32 is a solid one-piece metal part, which has a solid protruding end portion 46 and a flared middle portion 48 delimiting a cavity 50 of constant velocity joint.

In this embodiment, the cavity comprises rolling tracks 461 located opposite complementary rolling tracks 321 formed on a transmission joint nut 322, to guide rolling bodies 323 along concave trajectories, for example in an arc of a circle, each located in a plane containing the axis of rotation 100. In a known way, this assembly forms a transmission joint 320 that allows the transmission of a movement and a torque between the nut 322, secured to a transmission shaft 324, and the transmission bowl 32, secured to the wheel hub 30, whereas in operation, the transmission shaft 324 does not remain perfectly aligned with the axis of rotation 100 imposed by the outer ring 20, having recalled that the latter is supported by a suspension element ensuring one or more degrees freedom of movement of the outer ring 20 relative to the vehicle body.

The protruding portion 46 of the transmission bowl 32 is splined and mounted free, fitted or shrunk in a splined tubular cavity 47 of the wheel hub 30, forming a splined contact interface.

Furthermore, FIG. 1A shows means for attaching the transmission bowl 32 and the wheel hub 30, which implement a nut 88 screwed to a threaded end 90 of the protruding portion 46, and bearing against the shoulder 84 of the wheel hub 30.

The first inner rolling bearing ring 34 is shrink-fitted on a cylindrical shrink-fit bearing 52 of the wheel hub 30, bearing axially against an annular shoulder 54 formed on the wheel hub 30. A first inner raceway 56 is formed on the first inner rolling bearing ring 34 facing the first outer raceway 22.

The second inner rolling bearing ring 36 is also shrink-fitted on the cylindrical shrink-fit bearing 52 of the wheel hub 30, with a transverse end face 57 bearing axially against the first inner rolling bearing ring 34, and has an annular transverse abutment face 58 axially facing away from the inner raceway 56, and axially protruding relative to the wheel hub 30, so as to bear against a shoulder 60 formed on the transmission bowl 32. In this embodiment, the annular transverse abutment face 58 and the shoulder 60 are flat. A second inner raceway 62 is formed on the second inner rolling bearing ring 36 opposite the second outer raceway 24. The rolling bodies 16, 18 form, on the one hand, a first row of rolling bodies 16 that roll on the first outer raceway 22 and the first inner raceway 56 and, on the other hand, a second row of rolling bodies 18 that roll on the second outer raceway 24 and the second inner raceway 62.

Figure 1B:
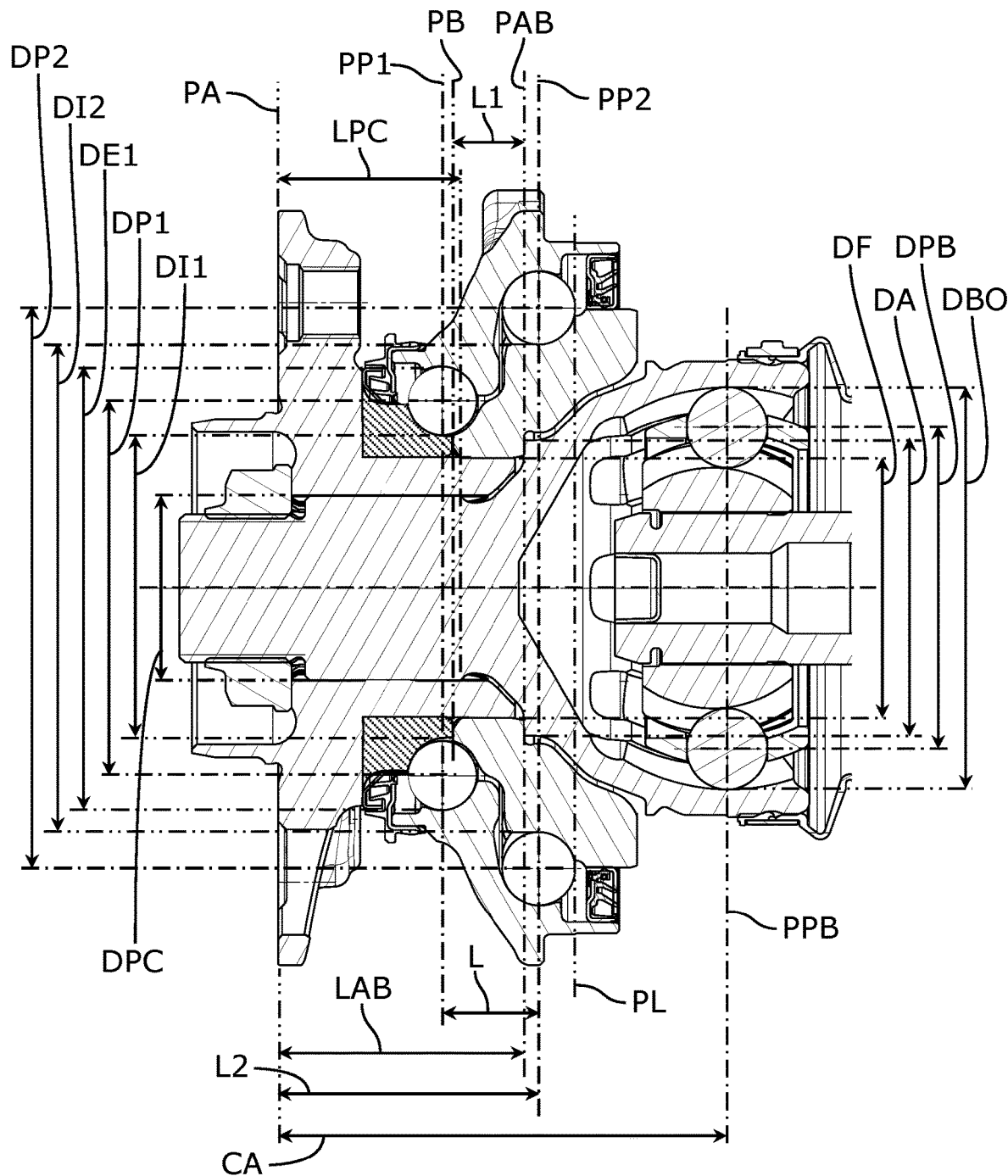
FIG. 1B is identical to FIG. 1A, but different characteristic dimensions of the wheel assembly have been included.

For the rest of the description, we will focus on certain remarkable dimensional characteristics of the assembly, illustrated in FIG. 1B, which require some preliminary definitions. Thus, we note:

PP1, the pitch plane where the pitch circle is located constituting the trajectory of the centers of the rolling bodies 16 of the first row of rolling bodies;

PP2, the pitch plane where the pitch circle is located constituting the trajectory of the centers of the rolling bodies 18 of the second row of rolling bodies;

DP1, the diameter of the pitch circle of the first row of rolling bodies 16;

DP2, the diameter of the pitch circle of the second row of rolling bodies 18;

DC1, the diameter of the balls 16 making up the rolling bodies of the first row of rolling bodies;

DC2, the diameter of the balls 18 making up the rolling bodies of the second row of rolling bodies;

PA, a plane perpendicular to the axis of rotation 100 and tangent to the mounting face 42;

PB, a plane perpendicular to the axis of rotation 100 and tangent to the axial end face 57 of the second inner ring 36 facing in the direction of dismounting 200;

PL, a plane perpendicular to the axis of rotation 100, and tangent to the rolling bodies 18 of the second row of rolling bodies, and on the same side of which are the two rows of rolling bodies 16, 18;

DA, the maximum diameter of the contact interface, that is to say, the effective contact zone, between the transverse annular abutment face 58 formed on the second inner rolling bearing ring 36 and the annular bearing face 60 of the transmission bowl 38;

PAB, the plane perpendicular to the axis of rotation 100 and containing the points of the contact interface between the annular transverse abutment face 58 formed on the second inner rolling bearing ring 36 and the annular bearing face 60 of the transmission bowl 38 farthest from the axis of rotation (in other words, the plane in which the circle of radius DA is drawn);

DBO, the track bottom diameter of the rolling tracks formed in the cavity 50 of the transmission bowl 32;

DPB, the pitch diameter of the transmission joint 320, which is the diameter of the pitch circle containing the centers of the rolling bodies 323 of the transmission joint 320 when the axis of the transmission shaft 324 and the axis of rotation 100 are aligned, PPB, the plane containing the pitch circle of the transmission joint 320, perpendicular to the axis of rotation 100 when the axis of the transmission shaft 324 and the axis of rotation 100 are aligned, DI1, a raceway bottom diameter of the first inner raceway 56, defined as the smallest diameter of the raceway 56;

DI2, a raceway bottom diameter of the second inner raceway 62, defined as the smallest diameter of the raceway 62;

DE1, a raceway bottom diameter of the first outer raceway 22, defined as the largest diameter of the outer raceway 22;

DF, the diameter of the shrink-fit bearing 52, at the second inner rolling bearing ring 36;

DPC, the spline pitch diameter of the splined contact interface (i.e. the area of effective contact) between the protruding portion 46 of the transmission bowl 32 and the splined tubular portion 47 of the wheel hub 30;

LPC, the distance, measured parallel to the axis of rotation 100, between on the one hand the assembly reference plane PA and, on the other hand, one end of the splined contact interface between the protruding portion 46 of the transmission bowl 32 and the splined tubular portion 47 of the wheel hub 30 closest to the interface between the transmission bowl 32 and the second inner rolling bearing ring 36.

The outer raceways 22, 24 formed on the outer rolling bearing ring 20 are enveloping in the axial direction, in the sense that they each have a raceway bottom 64, 66, located in an intermediate position between the axial ends of the corresponding raceway 22, 24. The rolling bodies 16, 18 here are balls, and the raceways 22, 24, 56, 62 are arranged so as to constitute a rolling bearing with two rows of angular contact balls of the so-called "O" type. In other words, the points of contact between the rolling bodies 16 of the first row and the associated raceways 22, 56 are located on a first contact cone having a first vertex located, with respect to the first row of rolling bodies 16, opposite the second row of rolling bodies 18, while the points of contact between the rolling bodies of the second row 18 and the associated raceways 24, 62 are located on a second contact cone having a second vertex located, relative to the second row of rolling bodies 18, opposite the first row of rolling bodies 16.

Remarkably, the annular bearing surface 60 for at least axial bearing of the transmission bowl 32 on the second inner rolling bearing ring 36 is positioned axially between the pitch plane PP1 of the first row of rolling bodies 16 and the limit plane PL, and preferably, between the pitch plane PP1 of the first row of rolling bodies 16 and the pitch plane PP2 of the second row of rolling bodies. The annular bearing face 60 is located radially between the shrink-fit bearing 52 of the wheel hub 30 and the second inner raceway 62, and preferably between the shrink-fit bearing 52 and the diameter of the bottom of the raceway of the first outer raceway 64. In the radial direction, this translates into the fact that the diameter DA is greater than the shrinking diameter OF and less than the raceway bottom diameter DI2, and preferably less than the raceway bottom diameter DE1.

This positioning gives the assembly 10 great axial compactness and excellent rigidity.

Preferably, the raceway bottom diameter DE1 of the first outer raceway 22 is less than the inner raceway bottom diameter D12 of the second inner raceway 62.

The track bottom diameter BOD of the rolling tracks 461 formed in the cavity 50 of the transmission bowl 32 satisfies the following conditions:
the track bottom diameter DBO is greater than the raceway bottom diameter DI1 of the first inner raceway 56,
the track bottom diameter DBO is less than the raceway bottom diameter DI2 of the second inner raceway 62;
the track bottom diameter DBO is greater than the maximum diameter DA of the annular bearing surface 60.

In this first embodiment, the rolling bodies 16, 18 are balls, the balls forming the first row of rolling bodies 16 having a diameter DC1 less than or equal to the diameter DC2 of the balls forming the second row of rolling bodies 18. Choosing a relatively small diameter for the first row of balls 16 makes it possible to retain a sufficient axial thickness of the second inner rolling bearing ring 36 in the shrink-fit region on the wheel hub 30, close to the first row of rolling bodies 16, and to bring together the pitch planes PP1 and PP2. The choice of a larger diameter for the second row of rolling bodies 18 makes it possible to ensure good load resistance, while maintaining a relatively small distance between the two pitch planes PP1 and PP2.

The axial end plane PB of the second inner rolling bearing ring 36 is located at a distance L1 from the plane PAB which is less than one and a half times the ball diameter DC1 of the balls of the first row of rolling bodies 16:

$$\frac{L1}{DC1} < \frac{3}{2}$$

The pitch plane PPB is located at a distance CA from the plane PA, which satisfies one or more of the following conditions:
the distance CA is less than the pitch diameter DP2 of the second row of rolling bodies 18;
the distance CA is less than thirteen sevenths of the axial distance L2 measured between the tangent plane PA and the pitch plane PP2 of the second row of rolling bodies 18;
the ratio between the distance CA and the distance L between the first pitch plane PP1 and the second pitch plane PP2 is less than 4.75, preferably less than 4.6;
the ratio between, on the one hand, the difference between the distance CA and the distance L2 between the plane PA and the second pitch plane PP2 and, on the other hand, the pitch diameter PD2 of the second row of rolling bodies 18, is less than 0.45:

$$\frac{CA - L2}{PD2} < \frac{9}{20}$$

The maximum contact diameter DA satisfies one or more of the following conditions:
the ratio between the diameter DA and the pitch diameter DP2 of the second row of rolling bodies 18 less than 0.65:

$$\frac{DA}{DP_2} < \frac{13}{20}$$

the diameter DA is less than the sum of the diameter OF of the shrink-fit bearing 52 and the diameter DC1 of the rolling bodies 16 of the first row of rolling bodies:

$$DA < (DF + DC1)$$

The pitch diameter DP2 of the second row of rolling bodies 18 is greater than the sum of the spline pitch diameter DPC and the distance LAB between the plane PA and the plane PAB:

$$DPC + LAB < DP2$$

The distance LPC measured between an end of the splined contact interface axially closest to the annular contact interface of the plane PAB and the assembly reference plane (PA) is less than $4/5^{th}$ of the distance L2 between the plane PA and the pitch plane PP2 of the second row of rolling bodies 18:

$$\frac{LPC}{L2} < \frac{4}{5}$$

In practice, the diameter DA is less than the pitch diameter DPB of the transmission joint.

As a variant of this first embodiment, the first raceway 56 can be formed directly on the wheel hub 30.

In another variant, the balls 16, 18 of the two rows of balls may have the same diameter.

Figure 2:
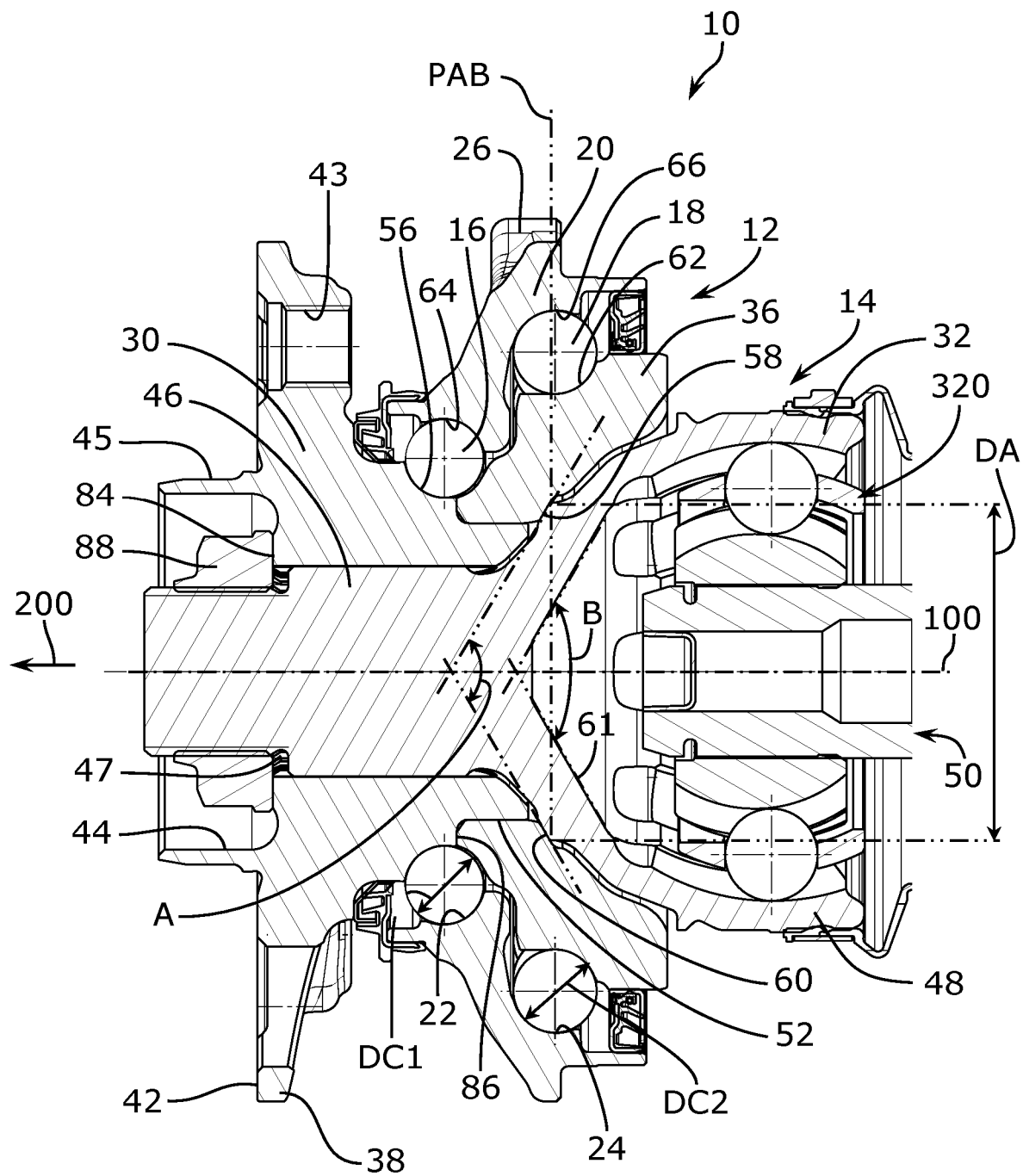
FIG. 2 is a longitudinal sectional view of a motor vehicle drive wheel assembly according to a second embodiment of the invention.

The embodiment of FIG. 2 differs from that of FIGS. 1A and 1B primarily in that the first inner raceway 56 is formed directly on the wheel hub 30. The second inner raceway 62 is in turn formed on an inner rolling bearing ring 36 that we will continue to call "second" inner rolling bearing ring for convenience. This second inner rolling bearing ring 36 is shrink-fitted on the shrink-fit bearing 52 and axially bears against a shoulder 86 of the wheel hub 30, and against the shoulder 60 of the transmission bowl 32. This embodiment differs from that of FIGS. 1A and 1B secondarily by the flared shape, here frustoconical, of the annular abutment face 58 and of the annular bearing face 60. Note in particular the positioning of the plane PAB and the dimension DA in FIG. 2, which correspond to the largest circle of the contact zone between the annular abutment face 58 and the annular bearing face 60. The vertex angle A of the annular bearing face 60 and of the annular abutment face 58 is preferably between 100° and 140°. The vertex angle A is moreover preferably equal, to within +/−10°, to a vertex angle B of a frustoconical inner face 61 of the transmission bowl 32, opposite the annular bearing face 60.

The dimensional characteristics presented for the first embodiment are also present in the second embodiment. In particular, the contact interface produced between the annular bearing face 60 and the annular abutment face 58 is positioned axially between the pitch plane PP1 of the first row of rolling bodies 16 and the limit plane PL, and preferably between the pitch planes PP1 PP2 of the two rows of rolling bodies 16, 18, and radially between the shrink-fit bearing 52 of the wheel hub 30 and the second inner raceway 62, and preferably between the shrink-fit bearing 52 and the transverse plane containing the diameter of the raceway bottom of the first outer raceway 64.

Figure 3:
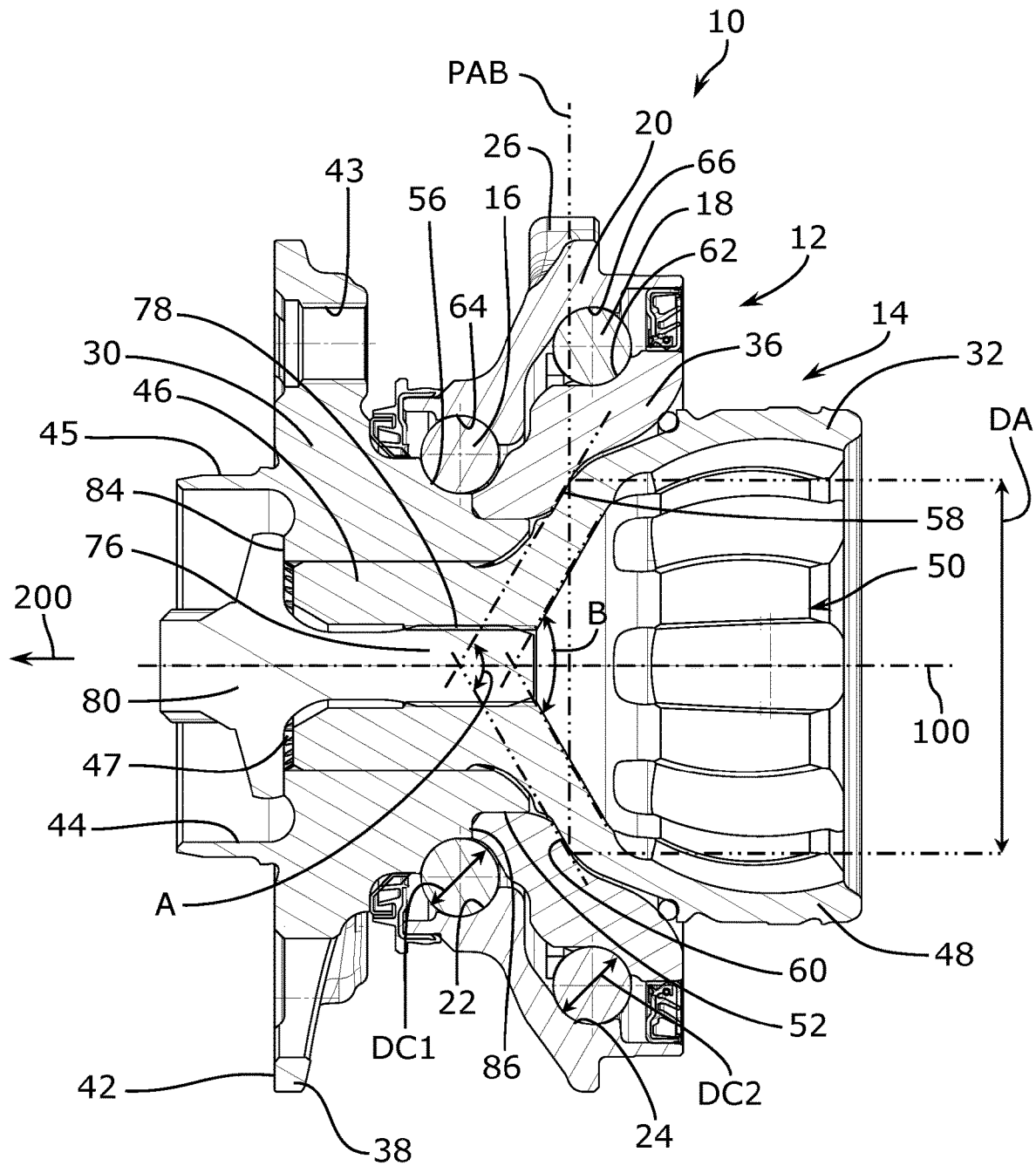
FIG. 3 is a longitudinal sectional view of a motor vehicle drive wheel assembly according to a third embodiment of the invention.

The embodiment of FIG. 3 is a variant of the embodiment of FIG. 2, in which the diameters of the balls of the two rows of rolling bodies 16, 18 are equal. There is then a slightly less efficient axial compactness than in the second embodiment, but a simplification when mounting the rolling bearing, the risk of error in the choice of the balls being ruled out.

FIG. 3 shows means for securing the connection between the wheel hub 30 and the transmission bowl 32, which implement a screw 76 engaged in a threaded hole 78 of the protruding portion 46 of the transmission bowl 32, and the head 80 of which bears against a shoulder 84 of the wheel hub facing away from the transmission bowl 32. These securing means can be transposed to all embodiments.

Naturally, the examples shown in the figures and discussed above are provided for illustrative and non-limiting purposes only.

As a variant, it is possible to provide a fixed subassembly in several parts, with a damp 26 in one or more parts forming the attachment damp to a suspension element of the vehicle, and two coaxial outer rolling bearing rings shrunk in this clamp.

The rolling bodies 16, 18 of one or the other of the two rows can be constituted by rollers having an axis of rotational symmetry, the center of each rolling body being defined as the center of gravity of the rolling body, and the rolling body diameter as the diameter measured in a plane perpendicular to the axis of rotational symmetry of the rolling body and passing through the rolling body's center of gravity.

It is explicitly provided that it is possible to combine the various illustrated embodiments in order to provide others. For example, the modes of attachment between the transmission bowl 32 and the wheel hub 30 illustrated in FIGS. 1 and 2 can be applied equally to all the embodiments for drive wheels. More generally, the wheel hub 30 can be attached on the transmission bowl 32 by any appropriate means, in particular by the method described in application FR 3,003,201. It is also possible to provide pre-machined splines on the wall of the tubular cavity 47 of the wheel hub 30 and on the corresponding part of the protruding portion 46 of the transmission bowl 32.

The transmission joint 320 has been illustrated as a Rzeppa type constant-velocity joint controlled by the rolling tracks 461, 321, but other variants of constant-velocity joints are possible, for example Rzeppa joints controlled by the joint cage, or cross-track joints. Thus, the rolling tracks 461, 321 are not necessarily circular, or even necessarily concave, straight tracks also being possible.

It is emphasized that all the features, as they emerge for a person skilled in the art from the present description, the drawings and the attached claims, even if concretely they have only been described in relation to other determined features, both individually and in arbitrary combinations, may be combined with other features or groups of features disclosed here, provided that this has not been expressly excluded or that technical circumstances make such combinations impossible or devoid of meaning.

Throughout the text of the present application, "fixed subassembly" has been used to refer to a subassembly that constitutes a fixed coordinate system for the rotation of the movable subassembly. Those skilled in the art will have understood that this subassembly is itself required to move relative to the body of the vehicle, depending on the geometry of the suspension interposed between the body of the vehicle and the fixed subassembly.

The invention claimed is:

1. A motor vehicle drive wheel assembly, comprising:
a fixed subassembly comprising a first annular outer raceway and a second annular outer raceway centered on a common axis of rotation;
a rotating subassembly, capable of rotating relative to the fixed subassembly about the axis of rotation, comprising a wheel hub comprising a flange provided with an interface for attaching a wheel rim or a brake disc, the flange having a mounting face for the wheel rim or for the brake disc axially facing in a direction of disassembly of the wheel rim or of the brake disc, the direction of disassembly being parallel to the axis of rotation, the mounting face being coplanar with an assembly reference plane, the assembly reference plane perpendicular to the axis of rotation, a transmission bowl, and at least one inner rolling bearing ring, the inner rolling bearing ring being shrunk over a shrink-fit seat of the wheel hub, the inner rolling bearing ring bearing against the transmission bowl at an annular contact interface extending at least in a radial direction with respect to the axis of rotation, the rotating subassembly further comprising a first inner raceway located opposite the first outer raceway and a second inner raceway located opposite the second outer raceway and formed on the inner rolling bearing ring; and
rolling bodies, forming a first row of rolling bodies capable of rolling on the first outer raceway and the first inner raceway and a second row of rolling bodies capable of rolling on the second outer raceway and the second inner raceway, a first pitch plane containing the centers of the rolling bodies of the first row of rolling bodies being located at a non-zero distance from a second pitch plane containing the centers of the rolling bodies of the second row of rolling bodies, in the direction of disassembly, the first row of rolling bodies and the second row of rolling bodies being located on the same outer side of a limit plane of the drive wheel assembly tangential to the rolling bodies of the second row of rolling bodies and perpendicular to the axis of rotation; wherein
the annular contact interface between the inner rolling bearing ring and the annular bearing face of the transmission bowl is positioned at least partially between the first pitch plane and the limit plane and has a maximum contact diameter that is greater than a diameter of the shrink-fit seat and less than a raceway bottom diameter of the second inner raceway.

2. The motor vehicle drive wheel assembly of claim 1, wherein the annular contact interface is positioned at least partially between the first pitch plane and the second pitch plane.

3. The motor vehicle drive wheel assembly of claim 2, wherein the annular contact interface between the inner rolling bearing ring and the annular bearing face of the transmission bowl is positioned completely between the first pitch plane and the limit plane and has a maximum contact diameter that is greater than the diameter of the shrink-fit seat and less than a raceway bottom diameter of the second inner raceway.

4. The motor vehicle drive wheel assembly of claim 1, wherein the first outer raceway has a raceway bottom diameter smaller than a raceway bottom diameter of the second inner raceway.

5. The motor vehicle drive wheel assembly of claim 1, wherein the transmission bowl has a cavity comprising rolling tracks, the rolling tracks having a track bottom diameter satisfying at least one of the following conditions:
the track bottom diameter is greater than a raceway bottom diameter of the first inner raceway,
the track bottom diameter is less than a raceway bottom diameter of the second inner raceway; or
the track bottom diameter is greater than the maximum contact diameter of the annular contact interface.

6. The motor vehicle drive wheel assembly of claim 1, wherein the rolling bodies are balls, the balls forming the first row of rolling bodies having a first ball diameter less than or equal to a second ball diameter of the balls forming the second row of rolling bodies.

7. The motor vehicle drive wheel assembly of claim 6, wherein the inner rolling bearing ring has an end face facing axially in the direction of disassembly, and located at a spacing distance from a plane containing the points of the annular contact interface furthest from the axis of rotation, the spacing distance being less than one and a half times the first ball diameter.

8. The motor vehicle drive wheel assembly of claim 6, wherein the maximum contact diameter of the annular contact interface is less than the sum of twice the first ball diameter and the diameter of the shrink-fit seat.

9. The motor vehicle drive wheel assembly of claim 1, further comprising a transmission nut and rolling transmission bodies, the rolling transmission bodies having centers and being guided by rolling tracks formed in a cavity of the transmission bowl and on the transmission nut, the transmission nut, the rolling transmission bodies and the transmission bowl forming a transmission joint defining a pitch plane of the transmission joint and a pitch diameter of the transmission joint, the pitch plane of the transmission joint being perpendicular to the common axis of rotation and containing the centers of the rolling transmission bodies, the pitch diameter of the transmission joint being twice the distance as a distance between the centers of the rolling transmission bodies and the common axis of rotation.

10. The motor vehicle drive wheel assembly of claim 9, wherein the maximum contact diameter of the annular contact interface is less than the pitch diameter of the transmission joint.

11. The motor vehicle drive wheel assembly of claim 9, wherein the pitch plane of the transmission joint is located at an inter-planar distance from the assembly reference plane and satisfies at least one of the following conditions:
the inter-planar distance is less than a pitch diameter of the second row of rolling bodies; and/or
the inter-planar distance CA is less than thirteen sevenths of an axial distance measured between the assembly reference plane and the second pitch plane; and/or
a ratio between the inter-planar distance and a distance between the first pitch plane and the second pitch plane is less than 4.75; and/or
a ratio between the difference between the inter-planar distance and an axial distance between the assembly reference plane and the second pitch plane and a pitch diameter of the second row of rolling bodies, is less than 0.45.

12. The motor vehicle drive wheel assembly of claim 1, wherein the annular contact interface is planar.

13. The motor vehicle drive wheel assembly of claim 1, wherein the annular contact interface is flared and has a first vertex angle satisfying at least one of the following conditions:
the first vertex angle is between 100° and 140°; or
the first vertex angle is equal, to within +/−10°, to a second vertex angle of a frustoconical inner face of the transmission bowl, opposite the annular contact interface.

14. The motor vehicle drive wheel assembly of claim 1, wherein a ratio between the maximum contact diameter of the annular contact interface and a pitch diameter of the second row of rolling bodies less than 0.65.

15. The motor vehicle drive wheel assembly of claim 1, wherein the transmission bowl comprises a splined end portion mounted in a splined tubular portion of the wheel hub, forming a splined contact interface.

16. The motor vehicle drive wheel assembly of claim 15, wherein the splined contact interface has a spline pitch diameter and the annular contact interface is located axially at an axial distance from the assembly reference plane, such that the sum of the spline pitch diameter and the axial distance is less than a pitch diameter of the second row of rolling bodies.

17. The motor vehicle drive wheel assembly of claim 15, wherein a distance between an end of the splined contact interface axially closest to the annular contact interface and the assembly reference plane is less than four-fifths of a length between the assembly reference plane and the second pitch plane.

18. The motor vehicle drive wheel assembly of claim 1, wherein the wheel hub is a solid one-piece metal part.

19. The motor vehicle drive wheel assembly of claim 1, wherein the rotating subassembly further comprises a brake disc bearing on the mounting face, a wheel rim bearing on the brake disc and elements for attaching the wheel rim and the brake disc to the flange.

20. The motor vehicle drive wheel assembly of claim 1, wherein the annular contact interface between the inner rolling bearing ring and the annular bearing face of the transmission bowl is positioned completely between the first pitch plane and the limit plane and has a maximum contact diameter that is greater than the diameter of the shrink-fit seat and less than a raceway bottom diameter of the second inner raceway.

* * * * *